Patented May 11, 1943

2,319,070

UNITED STATES PATENT OFFICE 2,319,070

MANUFACTURE OF UNSATURATED ALIPHATIC ACIDS AND ANHYDRIDES

Wesley G. Lowe and William O. Kenyon, Rochester, N. Y., assignors to Eastman Kodak Company, Rochester, N. Y., a corporation of New Jersey No Drawing. Application March 31, 1938,
Serial No. 199,279

10 Claims. (Cl. 260—546)

This invention relates to the manufacture of unsaturated aliphatic compounds containing at least 3 carbon atoms, and more particularly to unsaturated aliphatic compounds such as acrylic acids, acrylic anhydrides, acrylic acid chlorides, and the like.

Such unsaturated compounds as acrylic acid, while having been known for some time, have not been in particular demand commercially; hence, relatively few processes for their manufacture have been developed. However, recent demands for such chemical compounds for use in condensation, polymerization, resin manufacture and for other purposes, make it highly desirable that various new methods be developed for the production of these unsaturated compounds as well as the production of other new unsaturated compounds.

As to certain compounds contemplated by our invention, such as methacrylic anhydride, we believe we are the first to produce this material. We have found new methods whereby the various unsaturated acids, anhydrides, acid chlorides and the like may be produced. The products obtained may be used in condensation, polymerization and other such processes.

While various cleavage and exchange reactions have been carried out for manufacturing saturated acids, anhydrides, etc., the manufacture of unsaturated compounds presents different considerations, in view of the presence of the possibility of components in the reaction mixture reacting with and destroying the double bond in the unsaturated compound.

We have found, however, in a number of instances, that we may carry out processes wherein the unsaturated compounds may be produced and the double bond maintained intact without destruction by reaction with components in the reaction mixture. We have found that by our processes various unsaturated acids, anhydrides and acid chlorides and the like may be produced and isolated from the reaction mixture.

This invention has for an object to provide a process for the manufacture of unsaturated aliphatic compounds containing at least 3, but not more than 8 carbon atoms in the molecule. Another object is to provide processes for the manufacture of acrylic acids, acrylic anhydrides and acrylic acid chlorides. Still another object is to provide a method for the manufacture of methacrylic anhydride. A still further object is to provide a process for the conversion of β-halogen acids, anhydrides and/or their salts to corresponding unsaturated aliphatic compounds. Still another object is to provide a process for converting aliphatic esters to acids and anhydrides. Another object is to provide a process for converting β-chloropropionic acid, its salts or anhydride, to acrylic acid, acrylic acid chloride and/or acrylic anhydride. Still another object is to provide a method for converting an ester of methacrylic acid to methacrylic acid and methacrylic anhydride. Still another object is to provide a process wherein there is cleavage of hydrogen halide. A still further object is to provide a chemical process which proceeds at relatively low temperatures. A still further object is to provide chemical processes which are relatively simple and economical of operation. Other objects will appear hereinafter.

We have found that various aliphatic compounds containing 3 or more carbon atoms may be converted to unsaturated acids, anhydrides and acid chlorides by our process, which includes the step of heating such compounds in the presence of acetic anhydride.

Our invention may be more clearly understood by reference to the following examples, which are set forth for the purposes of illustration and for describing our preferred embodiment. Hence, these examples are not to be construed as limiting our invention.

*Example I.*—50 grams of β-chloropropionic acid were refluxed with approximately 50 cc. of acetic anhydride for 1½ hours. About 70 cc. of a material chiefly acetic acid was then distilled off at between 118° C.–120° C. This product contained hydrogen chloride. A further distillate was obtained boiling at 138° C. All but the first 55 cc. was fractionated to yield about 15 cc. of a satisfactory grade of acrylic acid.

*Example II.*—15 cc. of β-chloropropionic anhydride and 10 cc. of acetic anhydride were mixed and distilled at 760 mm. pressure. The β-chloropropionic anhydride was decomposed almost quantitatively to yield acrylyl chloride, acetyl chloride, acetic acid, and acrylic acids. No fraction boiling above 141° C. (the boiling point of acrylic acid) was obtained.

The various components, acetyl chloride, acetic acid, and the like, may be separated from the acrylic acid by means of distillation. In the above examples it will be observed that although acetic acid was present in the reaction mixture, it did not appreciably attack the double bond of the acrylic acid formed. It was therefore possible to readily remove the acetic acid by distillation.

*Example III.*—15 grams of potassium β-chloropropionate were treated with 1 cc. of acetic anhydride and heated to 150° C. in a glycerine bath. Reaction occurred, the dry salt changing in color from yellow to white and a large quantity of liquid was generated. After 10 minutes heating, the product was distilled under reduced pressure, and the resulting distillate was refractionated at atmospheric pressure. Eight cc. of water-white acrylic acid (containing a small amount of acetic acid) were obtained, boiling at 140–142° C. This yield is nearly quantitative.

*Example IV.*—20 grams of potassium β-chloropropionate were treated with 20 cc. of acetic anhydride and refluxed for 10 minutes. At the end of this time the product was distilled under reduced pressure to yield 27 cc. of liquid. This was fractionated at 760 mm. Ten cc. of acetic acid were obtained. Further fractionation yielded acetic anhydride and finally acrylic anhydride which distilled at 55–60° C. at 12 mm. pressure and 155–160° at 760 mm. The neutralization equivalent of the acrylic anhydride was 60, the theoretical being 63.

*Example V.*—133 grams of sodium β-chloropropionate were treated with 30 cc. of acetic anhydride and heated at 150° C. for 20 minutes. The mixture was first distilled at reduced pressure to prevent polymerization while removing the desired components from the residual salt. Forty cc. of acetic anhydride and ½ gm. of copper carbonate were added to the distillate and the acetic acid removed by slow distillation through a column. After no more acetic acid was being formed, the excess acetic anhydride was removed by distillation and finally the acrylic anhydride was distilled at 55–60° C. and 12 mm. pressure—yield 55 cc. The neutralization equivalent found was 62, the theoretical being 63.

In respect to Examples IV and V, it will be noted that a rather substantial amount of acetic anhydride was employed during the process, which anhydride not only facilitates the removal of the hydrogen halide, but also causes the formation of the unsaturated anhydride.

As previously indicated, our process is not restricted to the exact procedure set forth in the above examples. Our process may be subjected to some modification. That is, it is possible to modify the procedure set forth under Example V.

*Example VI.*—10 cc. of β-chloropropionic acid were treated with about 1 gram of aluminum oxide and distilled. The hydrogen chloride gas liberated during the process was conducted away from the reaction. Preferably the hydrogen chloride would be quantitatively removed. The acrylic acid produced was treated with a substantial amount of acetic anhydride in the presence of a copper salt in a manner similar to that described under Example V. Acetic acid and acetic anhydride were removed from the reaction mixture and finally reduced pressure was applied and acrylic anhydride distilled therefrom.

Another run similar to the preceding was carried out, but in this process β-chloropropionic anhydride was distilled in the presence of precipitated aluminum oxide. A mixture of acrylyl chloride and acrylic acid was obtained. The acrylic acid was then converted to the anhydride by procedure in accordance with the preceding description.

Although the foregoing examples have been set forth with respect to the preparation of the lower acrylic compounds, our invention has a wider application. We have found that our novel procedure may be applied in the manufacture of acrylic compounds such as methacrylic anhydride.

*Example VII.*—125 grams of methyl methacrylate were treated with 625 cc. of a 2N solution of potassium hydroxide in methanol. After standing for 90 hours at room temperature, the crystals were removed by filtration and another crop obtained by evaporating the filtrate in a stream of air; total yield 138 grams or about 90% of theory.

Fifty gm. of potassium methacrylate were treated with 150 cc. of ether and enough aqueous inorganic acid such as sulfuric or hydrochloric to displace the potassium. After 2 hours, the ether layer was removed and evaporated in a stream of air; yield 30 gm. of crude methacrylic acid.

This acid was heated with 30 cc. of acetic anhydride and 1 gm. of copper carbonate. The acetic acid formed was distilled off as it formed. On fractionating the residue, 11 gm. of methacrylic anhydride (75–80° C., 12 mm.) were obtained. An additional 7 gm. were obtained by further treatment of lower boiling fractions with acetic anhydride and copper carbonate. The neutralization equivalent was 76, theoretical 77.

The reaction which took place may possibly be diagrammatically illustrated as follows:

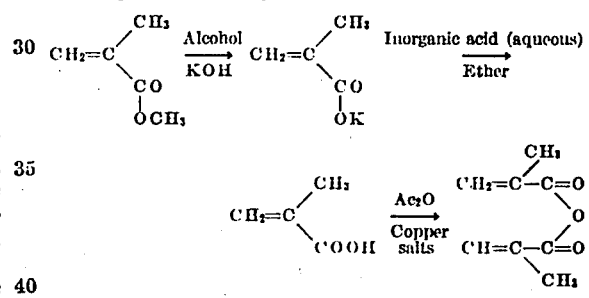

In the preceding examples, where we have indicated the use of copper salts and prefer these salts, certain other agents such as iron salts, hydroquinone, diphenylamine or pyrogallol may be used. Also, while our invention is particularly directed to β-halogen acids, it may be applied to a variety of substances containing the β-halogen ketone groups.

*Example VIII.*—A quantity of bromo isobutyric acid was obtained by the direct bromination of isobutyric acid in the presence of phosphorus. 154 grams of this bromo isobutyric acid was dissolved in 200 cc. of methanol and treated with 800 cc. of 1.12 N-solution of sodium hydroxide in methanol. The methanol was removed by distillation under reduced pressure leaving the sodium salt of isobutyric acid. To this was added 200 cc. of 85% acetic anhydride and the mixture was heated for approximately 15 minutes at the boiling point. Then it was distilled at reduced pressure. In this distillation no attempt was made to fractionate the constituents since the purpose was to remove the products from the non-volatile salts. However, the liquid obtained was fractionated, 1 gm. of copper carbonate being added to this fractionation step for preventing polymerization. Acetic acid and acetic anhydride were removed by this latter fractionation and 10 grams of methacrylic anhydride were added.

*Example IX.*—100 gm. of α-bromo isobutyric acid were converted to the sodium salt by treatment with an alcoholic alkali in a manner similar to that described in Example VIII. The resultant alkali salt was treated with 50 cc. of acetic anhydride and heated at the boiling point for 15 minutes, then vacuum distilled. 100 cc. of distillate obtained upon further fractionation yielded 15 cc. of methacrylic acid.

*Example X.*—Approximately 47 cc. of ethacrylic acid (α-ethacrylic acid boiling point 92° C. at 22 mm.) were treated with 50 cc. of acetic anhydride and 0.5 gm. of copper carbonate. The mixture was distilled at atmospheric pressure, removing acetic acid and acetic anhydride. The pressure was then reduced to approximately 15 mm. and 35 cc. of ethacrylic anhydride were obtained in the next fraction (B. P. 113° C. at 15 mm.). The molecular weight of this anhydride as indicated by titration of a weighted sample with standard sodium hydroxide was 182, which agrees with the calculated value.

*Example XI.*—Approximately 500 gm. of α-hydroxy isobutyric acid were mixed with 1000 cc. of 85% acetic anhydride. The mixture was distilled at atmospheric pressure through a fractionating column packed with copper rings. By this distillation the acetic acid and the bulk of the acetic anhydride were removed. The distillation equipment was then evacuated and distillation was continued. The first fraction comprised residual acetic anhydride. The next fraction comprised approximately 210 cc. of crude methacrylic acid which had a boiling point of approximately 85–86° at 28 mm. This crude fraction was re-distilled yielding 160 cc. of pure methacrylic acid. The yield, therefore, corresponded to about 40%. 150 cc. of this pure methacrylic acid was then mixed with 150 cc. of 85% acetic anhydride and 1 gm. of copper carbonate. The mixture was distilled at atmospheric pressure through the packed column which has been described, yielding about 120 cc. of acetic acid and 45 cc. of acetic anhydride. The pressure was then reduced and distillation continued. 20 cc. of methacrylic acid (boiling point 78° C. at 25 mm.) and 90 cc. of methacrylic anhydride (boiling point 98° C. at 25 mm.) were obtained.

It will be observed from the preceding examples that we have provided a number of procedures for forming acrylic acids, acrylic anhydrides, and related compounds. Whereas the prior art required the extensive use of various agents such as metal oxides and the like, our process permits the use of the organic compound acetic anhydride. The acetic acid produced in the reaction may be recovered and dehydrated to produce glacial acetic acid which may be used various ways industrially. Or, the acetic acid may be treated to convert it to ketene, acetic anhydride or other such compounds for re-use in the present process. We have been able, therefore, to provide a relatively simple and efficient process for the manufacture of acrylic acid and anhydride materials wherein a substantial portion of the reaction is obtained through the use of acetic anhydride. We have found that this agent not only produces the desired reaction but does not attack the double bond in the acrylic compounds.

While for simplicity of description we have confined the examples stated largely to materials employed and other related details, it is to be understood in carrying out our process that the reaction may be carried out in the usual type of packed or other similar commercial distillation column. The acetic anhydride may be supplied by vapors generated outside of the column and passed into contact with the other materials in the reaction zone within the column. The various agents employed such as copper salts, etc., may be subsequently removed by distillation away from these materials or filtration, or other procedure. It is also apparent that in carrying out our process various alkali solutions, alcoholic solutions, anti-polymerization agents and the like may be employed. By antipolymerization agents we refer to the materials such as copper salts and other compounds already described. In particular, we refer to agents which necessarily withstand distillation to some extent, inasmuch as our process includes this step. While we have described and prefer acetic anhydride, other aliphatic anhydrides may be employed, such as propionic and butyric, for example. Hence, we do not wish to be restricted in our invention excepting insofar as is necessitated by the prior art and the spirit of the appended claims.

What we claim and desire to secure by Letters Patent of the United States is:

1. As a chemical product, the anhydride having the formula:

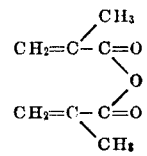

and having mixed therewith copper carbonate as an anti-polymerization agent.

2. A chemical process for producing unsaturated acid anhydrides having 6 to 8 carbon atoms, by steps including the step of heating a 3 to 4 carbon atom unsaturated aliphatic acid with a lower aliphatic anhydride and a copper salt anti-polymerization agent.

3. A process for the manufacture of polymerizable acrylic compounds which includes preparing a reaction mixture essentially comprising at least one compound from the group consisting of acrylic acid and β-alkyl substituted acrylic acid, together with a content of acetic anhydride, heating said reaction mixture to cause the formation of said polymerizable acrylic compounds, distilling acetic acid from the reaction mixture and conducting the reaction under said reaction conditions including said distilling, in the presence of a copper salt as an anti-polymerization agent whereby polymerization is minimized both during the reaction and the distillation.

4. A process for the manufacture of polymerizable acrylic compounds which comprises heating a reaction mixture comprising acrylic acid and a lower aliphatic anhydride in the presence of copper carbonate and distilling off the resulting aliphatic acid and anhydride from the reaction mixture.

5. A process of making methacrylic anhydride which comprises heating methacrylic acid with acetic anhydride and a polymerization inhibitor.

6. A monomeric carboxylic anhydryde of the formula:

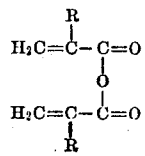

where R is a lower alkyl group.

7. A stabilized composition of matter which comprises monomeric alpha-substituted; methacrylic anhydride and a stabilizing amount of a polymerization inhibitor.

8. A monomeric alpha-substituted acrylic anhydride wherein the substituents are alkyl radicals each containing at least two carbon atoms.

9. A stabilized composition of matter which comprises a monomeric unsaturated carboxylic anhydride of a readily polymerizable acrylic acid devoid of hydrogen on the alpha carbon atom and a stabilizing amount of a polymerization inhibitor.

10. A process for the manufacture of polymerizable acrylic compounds which includes preparing a reaction mixture essentially comprising at least one compound from the group consisting of acrylic acid and β-alkyl substituted acrylic acid, together with a content of acetic anhydride, heating said reaction mixture to cause the formation of said polymerizable acrylic compounds, distilling acetic acid from the reaction mixture and conducting the reaction including said distilling in the presence of copper carbonate whereby polymerization is minimized both during the reaction and the distillation.

WESLEY G. LOWE.
WILLIAM O. KENYON.